United States Patent Office 3,000,226
Patented Sept. 19, 1961

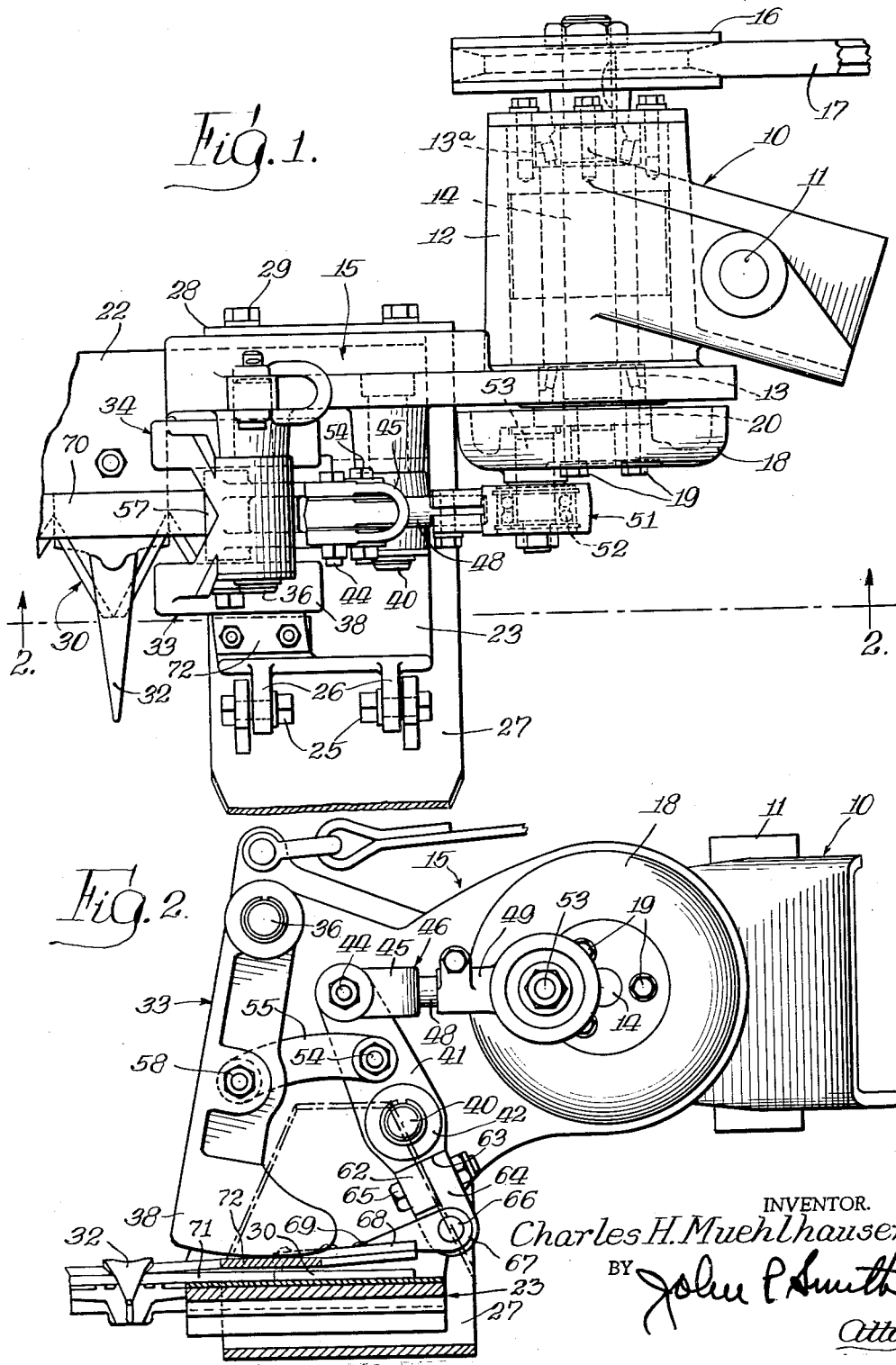

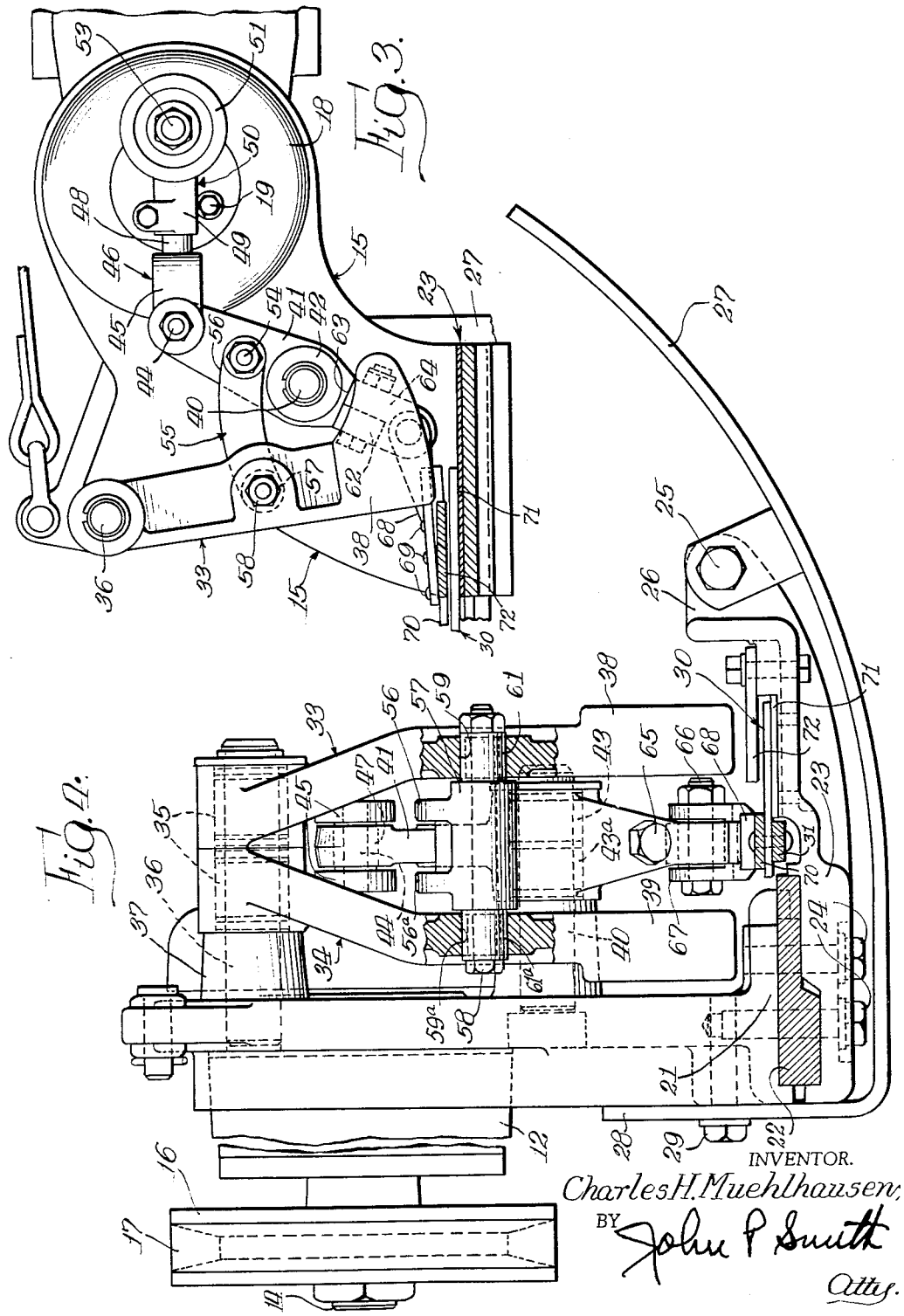

3,000,226
COUNTERBALANCED DRIVE MECHANISM
FOR HARVESTER
Charles H. Muehlhausen, Shelbyville, Ill., assignor, by mesne assignments, to Oliver Corporation, Chicago, Ill., a corporation of Delaware
Filed Mar. 13, 1958, Ser. No. 721,121
3 Claims. (Cl. 74—40)

The present invention relates generally to a harvester, but more particularly to an improved sickle drive mechanism therefor in which the inertia forces created by the reciprocating sickle are balanced against the inertia forces created in opposition to those of the sickle by means of a reciprocating counterweight.

The primary object of the present invention is to provide a novel means of driving a reciprocating sickle in a harvester and counterbalancing weights, whereby the inertia forces of the reciprocating sickle are balanced by means of a counterweight mounted for reciprocation in alternate strokes in opposition to the reciprocating strokes of the sickle.

It is a further object of the invention to utilize existing sickle drive principles insofar as possible so that the improved drive mechanism may be readily incorporated into harvesters of conventional design.

It is a further feature of the invention to incorporate the equivalent of two reciprocating counterweights located on the opposite sides of a driving connection between a reciprocating drive lever and the sickle, said driving connection having its opposite ends connected respectively to the sickle and the drive lever of the driving mechanism.

A still further object of the invention is to provide a novel and improved counterbalanced drive mechanism for a reciprocating cutter or sickle in which the operating parts are not displaced by reason of the angular adjustment of the cutter bar to any of its normal cutting angles or inoperative vertical position.

Still another object of the invention is to provide an improved counterbalanced drive mechanism for a reciprocating sickle in which the parts are more economical to manufacture and more accessible for repairs and adjustments than the parts of prior counterbalanced drive mechanisms.

These and other objects are accomplished by providing a construction and an arrangement of the various parts in the manner hereinafter described and particularly pointed out in the appended claims.

Referring to the drawings:

FIG. 1 is a top plan view of a fragmentary portion of a cutting mechanism having my improved counterbalanced drive mechanism embodied therein;

FIG. 2 is a cross-sectional view taken on the line 2—2 in FIG. 1;

FIG. 3 is a cross-sectional view similar to FIG. 2, except for showing the operating parts thereof at the other end of the stroke from that shown in FIG. 2; and FIG. 4 is an enlarged outside side elevational view with certain portions shown broken away for clearness.

For the purpose of illustration, I have shown my improved driving mechanism in connection with a cutter bar mechanism primarily used in connection with mowers attached to an intermediate frame which, in turn, is connected to one side or rear of a tractor. In this instance, a hinge bracket or support member, generally indicated by the reference character 10, is pivoted for horizontal movement on an intermediate frame member (not shown) by a vertically disposed pin 11. This hinge casting 10 includes a longitudinally extending and horizontally disposed sleeve-like portion 12 in which is journaled by suitable front and rear anti-friction bearings 13 and 13a, a drive shaft 14. Formed integrally with or secured to a cylindrical portion 12 of the hinge casting 10 is a transversely extending cutter bar supporting casting, generally indicated by the reference character 15. Secured to the rear end of the drive shaft 14 is a pulley 16 which, in turn, is geared to the operating parts of the tractor or other source of power by a belt 17. Secured to the front end of the drive shaft 14 is a crank driving disc or fly wheel 18. The fly wheel 18 is secured to the shaft 14 through the medium of bolts 19 secured to a disc member 20 which, in turn, is secured to the forward end of the shaft 14 in any well known manner. The cutter bar supporting casting 15 extends laterally to one side of the hinge casting 10 and is provided with a horizontally disposed flat recessed flange portion 21 adapted to receive and have secured therein a transversely extending cutter bar 22. Positioned below the cutter bar 22 adjacent the flange portion 21 of the cutter bar supporting casting 15 is a forwardly extending inner shoe or knife support 23. This inner shoe support 23 and cutter bar 22 are secured to the flange portion 21 of the casting 15 by means of vertically extending bolts 24. Pivotally secured by means of spaced apart bolts 25 on two horizontally spaced apart apertured ears 26 of the casting 23 is a conventionally curved shoe 27. This shoe 27 has its rear end curved upwardly at right angles as shown at 28 so as to be adjustably secured at the rear end thereof by means of a bolt 29 to the rear side of the casting 15 in the manner well understood in the art. A reciprocating knife or sickle, generally indicated by the reference character 30, is provided with the usual knife back 31 which, in turn, is supported in suitable recesses in the forward end of the supporting inner shoe 23 as clearly shown in FIG. 4 of the drawings. A wear plate 71 is secured to shoe 23 under the end of knife or sickle 30, and a retainer 72 is secured to shoe 23 above the end of knife or sickle 30 to prevent it from rising up. The knife and cutter bar are provided with the usual spaced apart guards 32 which, in turn, are secured to the cutter bar 22 in a manner well understood in the art.

My improved counterbalanced drive mechanism includes front and rear counterbalance weight levers, generally indicated by the reference characters 33 and 34. These levers are separately suspended on suitable anti-friction bearing members 35 which, in turn, are mounted on a common shaft or pin 36 secured to and horizontally supported on the cutter bar support casting 15 by an enlarged bearing stud 37 formed integrally therewith. By examination of FIG. 4 of the drawings, it will be noted that these counterbalance weights 33 and 34 diverge downwardly and outwardly so that the weights 38 and 39 on the lower ends thereof are positioned on the opposite sides of the driving connections between the flywheel drive and the cutter knife so as to equalize or counterbalance the inertia created by the reciprocating cutter knife. Mounted on a pin or stud shaft 40, secured to the casting 15, is a drive lever 41. The lever 41 is provided with an enlarged bearing portion 42 in which is mounted two spaced apart anti-friction members 43, 43a forming the bearing support for the lever 41 on the pin 40. The upper end of the drive lever 41 is pivotally connected by means of a pin or bolt 44 to the bifurcated portions 45 of a pitman yoke member, generally indicated by the reference character 46. An anti-friction member 47 forms the bearing for the pin 44 and is seated in the aperture in the upper end of the lever 41. Formed integrally with the pitman yoke member 46 is a threaded extension 48 which is adjustably mounted in the threaded barrel portion 49 of a pitman, generally indicated by the reference character 50. The pitman 50 includes an enlarged cylindrical bearing housing 51 and houses an anti-friction member 52 which, in turn, is supported on a pin 53. The pin 53 is secured to the flywheel 18 and is located off center with respect to the axis of the drive shaft 14 as clearly shown in FIG. 1 of the drawings. Pivoted on a bolt 54 secured to the lever 41 at a point between the pins 40 and 44 is a drive link 55. The drive link 55 has two laterally spaced apart apertured portions 56 and 56a which are positioned on the opposite sides of the lever 41 to receive the drive lever 41 therebetween. The other end of the drive link 55 is provided with a relatively longer barrel or bearing portion 57 which is adapted to be positioned between the counterbalance weight members 33 and 34. Extending through the bore of the barrel portion 57 of the link 55 is a bolt 58 for pivotally attaching the drive link 55 to the weight members 33 and 34. The bolt 58 extends through aligned apertures 59 and 59a respectively in the members 33 and 34. Suitable anti-friction members are mounted in each of the apertures 59 and 59a as shown at 61 and 61a respectively. Formed integrally with and located in the lower ends of the drive lever 41 is an apertured ear 62 so as to form a recess and straight flat shoulder as shown at 63. Mounted in this recess and against the shoulder 63 of the lever 41 is a removable drive connection or bearing 64. This drive connection 64 has an apertured ear which is seated in the recess of the lever 41 and is secured thereto so as to form the bearing at the lower end of the drive link 41 by a bolt 65. The member 64 is pivotally secured by means of a pin 66 through the spaced apart or bifurcated portions 67 of the knife head 68. The knife head 68 is secured by means of rivets 69 to a flat steel spring 70 which, in turn, is secured to the knife or sickle 30. The flat spring steel piece used in this connection is provided with sufficient flexibility because of the arc through which the lever 41 swings in driving the cutter knife.

It will be seen that I have provided an improved means of driving a reciprocating sickle and counterbalancing weights wherein a simple oscillating lever reciprocates the sickle and pivots the counterbalancing weighted levers. The parts are simple and economical to manufacture and easily accessible for repairs and adjustments, the expensive crankshafts, gears, etc. of former counterbalanced drive means having been eliminated. It will also be noted by positioning the counterweights on the opposite sides of the driving connections, any twisting or torque-like action is eliminated.

While in the above specification I have described one embodiment which my invention may assume in practice, it will, of course, be understood that the same is capable of modification and that modification may be made without departing from the spirit and scope of the invention as expressed in the following claims.

What I claim as my invention and desire to secure by Letters Patent is:

1. A counterbalanced drive mechanism for a reciprocating sickle comprising a support member, a drive shaft rotatably mounted in said support member, a unitary rigid drive lever spaced from said drive shaft and pivotally mounted intermediately of its ends on said support member and having a lower end adapted to be operatively connected to said reciprocating sickle, eccentrically driven means operatively connecting said drive shaft and an upper end of said drive lever, counterbalancing weight lever means spaced from said drive lever on the opposite side thereof from said drive shaft and pivotally mounted adjacent the upper end thereof on said support member, and a drive link operatively connected to said counterbalancing weight lever means intermediate the ends thereof and to said drive lever between its pivotal mounting on said support member and its connection to said drive shaft.

2. A counterbalanced drive mechanism as claimed in claim 1, wherein said counterbalancing weight lever means includes a pair of levers having enlarged weighted lower ends spaced apart on opposite sides of said drive lever whereby to prevent any twisting or torque-like action during operation of the drive mechanism.

3. A counterbalanced drive mechanism as claimed in claim 1, including a flat spring operatively connected at one end to the lower end of said drive lever and adapted to be connected adjacent its other end to said reciprocating sickle whereby to accommodate the arc through which the lower end of said drive lever swings during pivotal reciprocation thereof.

References Cited in the file of this patent

UNITED STATES PATENTS

| | | |
|---|---|---|
| 2,130,795 | Gollnick | Sept. 20, 1938 |
| 2,428,924 | Albertson | Oct. 14, 1947 |
| 2,619,839 | Love | Dec. 2, 1952 |
| 2,736,156 | Hardman | Feb. 28, 1956 |
| 2,745,238 | Hopkins | May 15, 1956 |
| 2,790,295 | Collins | Apr. 30, 1957 |
| 2,796,720 | Carlson | June 25, 1957 |
| 2,819,618 | Slusher | Jan. 14, 1958 |
| 2,827,753 | Collins | Mar. 25, 1958 |
| 2,835,133 | Rogers et al. | May 20, 1958 |